(12) United States Patent
Rekowski et al.

(10) Patent No.: US 6,432,490 B1
(45) Date of Patent: Aug. 13, 2002

(54) PROCESS FOR COATING SUBSTRATES

(75) Inventors: Volker Rekowski, Bochum; Oliver Reis, Witten; Martin Wulf, Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/781,338

(22) Filed: Feb. 12, 2001

(51) Int. Cl.[7] .................................................. C08F 2/48
(52) U.S. Cl. ........................ 427/508; 427/140; 427/261; 427/287; 427/388.1; 427/388.2; 427/407.1; 427/407.3; 427/510; 427/557; 427/559
(58) Field of Search .................................. 427/508, 510, 427/557, 559, 140, 261, 287, 388.1, 388.2, 407.1, 407.3

(56) References Cited

U.S. PATENT DOCUMENTS 5,932,282 A   8/1999   Diener et al.

FOREIGN PATENT DOCUMENTS

| DE | 19818735 A1 | 10/1999 |
|---|---|---|
| DE | 19913442 A1 | 9/2000 |
| DE | 19913446 A1 | 9/2000 |

*Primary Examiner*—Bernard Pianalto
(74) *Attorney, Agent, or Firm*—Sudhir G. Deshmukh

(57) ABSTRACT

The process of this invention applies at least one coating composition to an optionally precoated substrate and then cures the thus obtained coating layer(s), whereby at least one of the coating layers is prepared from a coating composition that can be chemically cross-linked solely by radical polymerization of olefinic double bonds, the resin solid of the composition has a C=C equivalent weight from 100 to 10,000, preferably from 100 to 5,000, and the curing of the coating layer(s) is carried out with NIR radiation in the wave length range from 760–1500 nm.

10 Claims, No Drawings

PROCESS FOR COATING SUBSTRATES

FIELD OF THE INVENTION

The invention relates to a process for coating substrates, in which one or more layers of coating that are applied are cured by means of NIR (near infra red) radiation. The process can be used in the application of automotive and industrial coatings.

DESCRIPTION OF RELATED ART

It is known that coating compositions cured by UV (ultraviolet light) radiation can be used as automotive and industrial coatings. These coating compositions contain film forming binders that are capable of radical polymerization and generally contain photoinitiators. Coating compositions that can be cured by means of UV radiation are described in DE-A-198 18 735 and in U.S. Pat. No. 5,932,282.

A known deficiency of coating compositions that can be cured by UV radiation is that poor curing is obtained in shadow areas, i.e. the areas which are not reached by the UV radiation. Also, yellowing of the coating occurs after UV irradiation when the coating compositions contain photoinitiators. The latter is a particularly disadvantage when these coating compositions are used as clear coats or lightly pigmented coats and especially, when they are used as white top coats.

The use of UV irradiation and photoinitiators in coating compositions having binders that are capable of radical polymerization can be avoided by a thermally initiating curing of the binders. Coating compositions containing binders that are capable of radical polymerization that are thermally cured in a conventional manner in combination with thermal radical initiators, present a problem when radical scavengers are used. The radical scavengers, e.g. light protecting agents based on HALS-products (HALS= hindered amine light stabilizer), significantly lower the level of curing of the layers of coating. The HALS-products impede the radical polymerization of the binders due to their function as radical scavengers. Light protecting agents, however, are a necessary component of coating compositions that are to be used for exterior and also for interior use, where protection against the influences of light is necessary.

It is further known to dry or to cure multilayer coatings with NIR radiation. Such processes are disclosed in DE-A-199 13 446 and in DE-A-199 13 442. One-component binder systems that dry physically or in an oxidative manner and two-component binder systems that are, for example, based on a hydroxyl and a polyisocyanate component or an epoxide and a polyamine component are used as the binders in these cases. Binders that can be cured by means of high-energy radiation, preferably binders that are capable of radical polymerization, can also be used. In the latter case, the coating compositions contain photoinitiators and UV radiation in addition to the NIR irradiation is used to cure the coating compositions.

This invention provides a process for coating substrates and forms coatings that do not exhibit yellowing or only slight yellowing, are completely cured and are suitable for exterior use, by using coating compositions based on binder systems that are capable of radical polymerization. The coatings obtained are capable of curing rapidly with NIR radiation and form coatings that are sufficiently hard and have a good quality surface.

SUMMARY OF THE INVENTION

The process of this invention applies at least one coating composition to an optionally precoated substrate and then cures the thus obtained coating layer(s), whereby at least one of the coating layers is prepared from a coating composition that can be chemically cross-linked solely by radical polymerization of olefinic double bonds, the resin solid of the composition has a C=C equivalent weight from 100 to 10,000, preferably from 100 to 5,000, and the curing of these coating layer(s) is carried out with NIR radiation in the wave length range from 760–1500 nm.

DETAILED DESCRIPTION OF THE EMBODIMENTS

Surprisingly, it has been found that by irradiating according to the invention and by curing the coating compositions based on binders that are capable of radical polymerization with NIR radiation, coatings are formed that exhibit slight or no yellowing when cured rapidly and completely even in the presence of radical scavengers, e.g. light protecting agents based on HALS-products (hindered amine light stabilizer products). It has not been possible hitherto to obtain complete curing of coating compositions based on binders that are capable of radical polymerization in combination with light protecting agents based on HALS-products, by using conventional thermal curing methods, for example, in ovens by means of convection or induction drying.

The NIR radiation used according to the invention is a short wave infrared radiation in the wavelength range from about 760 to about 1500 nm, preferably 760 to 1200 nm. Radiation sources for NIR radiation are, for example, conventional NIR radiators that emit a beam with a planar, linear or spot focus. Such NIR radiators are commercially available (for example, from the Adphos Company). These high-performance halogen radiators have an intensity (radiation capacity per surface) from in general over 10 $kW/m^2$ to 15 $MW/m^2$, preferably between 100 $kW/m^2$ and 800 kW $m^2$. The radiators reach a temperature at the surface of the radiator (filament temperature) of more than 2000 K, preferably more than 2900 K and typically are in a temperature range between 2000 and 3500 K. Suitable radiators have an emission spectrum with a maximum between 760 and 1200 nm.

The coating composition used in the process of this invention contains a binder that can be chemically cross-linked solely by radical polymerization of olefinic double bonds of the binder and optionally, contains a reactive thinner that is capable of radical polymerization and/or contains a physically drying binder.

The resin solid of the coating composition consists of binders that can be chemically cross-linked by radical polymerization of the olefinic double bonds, of optional reactive thinners and optional physically drying binders that can be incorporated therein. The resin solid has a C=C equivalent weight from 100 to 10,000 and preferably from 100 to 5,000.

The coating compositions suitable for use in the process of this invention contain one or more binders having olefinic double bonds capable of radical polymerization and are known to persons skilled in the art. These binders are prepolymers, such as polymers and oligomers, containing one or more, preferably, on average 2 to 20, and more preferably, 3–10 olefinic double bonds capable of radical polymerization per molecule.

The double bonds that can be polymerized, can be present in form of (meth)acryloyl, vinyl, allyl, maleinate and/or fumarate groups.

(Meth)acryloyl and (meth)acryl, respectively, shall mean here and in the following acryloyl and/or methacryloyl and acryl and/or methacryl, respectively.

Examples of useful prepolymers or oligomers are (meth) acryloyl-functional poly(meth)acrylates, polyurethane (meth)acrylates, polyester (meth)acrylates, polyether (meth) acrylates, silicone (meth)acrylates, epoxy(meth)acrylates, amino(meth)acrylates, melamine (meth)acrylates, unsaturated polyesters and unsaturated polyethers. The number average molecular mass Mn of these compounds can be, for example, from 500 to 10,000 g/mol, preferably, from 500 to 5000 g/mol. The binders can be used individually or in a mixture.

The prepolymers can be used in combination with reactive thinners, that are low molecular compounds capable of radical polymerization having a molecular mass below 500 g/mol. The reactive thinners can be mono-unsaturated, di-unsaturated or poly-unsaturated. Examples of mono-unsaturated reactive thinners are: (meth)acrylic acid and esters thereof, maleic acid and half esters thereof, vinyl acetate, vinyl ethers, substituted vinylureas, styrene, vinyl toluene. Examples of di-unsaturated reactive thinners are: di(meth)acrylates, such as, alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of poly-unsaturated reactive thinners are: glycerin tri(meth)acrylate, trimethylolpropane tri(meth)acrylate, pentaerythrite tri(meth) acrylate, pentaerythrite tetra(meth)acrylate. The reactive thinners can be used individually or in a mixture.

The resin solid of the coating compositions contain no additional binders that contribute to the cross-linking by way of chemical reactions other than the binders that are capable of radical polymerization and the optional reactive thinners that are capable of radical polymerization. The resin solids of the coating compositions can additionally contain physically drying binders. Physically drying binders are understood to mean those binders that cure solely by releasing solvents from the applied coating layer. Physically drying solvent-based or water-dilutable polyurethane, alkyd, polyester and/or polyacrylate resins known to one skilled in the art can be used as the physically drying binders.

The resin solid of the coating composition used in the process of this invention comprise 60 to 100 wt-% of binders capable of radical polymerization, 0 to 30 wt-% of reactive thinners capable of radical polymerization and 0 to 30 wt-% of physically drying binders.

The coating compositions suitable for use in the process of this invention can be liquid coating compositions or coating compositions in powder form. Liquid coating compositions can be water-based or solvent-based. They can contain water and/or organic solvents. In the case of water-based coating compositions, the binders contained therein can be stabilized in an ionic or in a non-ionic manner to obtain a sufficient water-dilutability. Alternatively, or in addition thereto, it is possible to obtain water-dilutability via external emulsifiers.

The organic solvents optionally contained in the liquid coating compositions are solvents conventionally used in coating techniques. These can result from the preparation of the binders or can be added separately. Examples of suitable solvents are as follows: monohydric or polyhydric alcohols, e.g., propanol, butanol, hexanol; glycol ethers or esters, e.g., diethylene glycol dialkyl ethers, dipropylene glycol dialkyl ethers, each having 1 to 6 carbon atoms in the alkyl group; ethoxypropanol; glycols, for example, butyl glycol, ethylene glycol, propylene glycol and oligomers thereof; N-methylpyrrolidone and ketones, for example, methyl ethyl ketone, acetone, cyclohexanone; esters, such as, butyl acetate, isobutyl acetate, amyl acetate; aromatic carbohydrates, such as, xylene, Solvesso 100 (registered trade mark for a mixture of aromatic carbohydrates having a boiling range from 155–185° C.) and aliphatic carbohydrates. If organic solvents are used in water-based coating compositions, the organic solvents preferably are water-miscible solvents.

The liquid coating composition can be formulated as 100% solids coating composition without water and without solvents.

The liquid coating compositions can be prepared by conventional techniques, such as, dispersing, mixing and/or homogenizing the individual components.

Coating compositions in powder form can be prepared by dry mixing all of the required components, extruding the components in the form of a paste-like melt, cooling off the melt, coarse comminution, fine milling and optionally, subsequent sieving to the desired grain fineness. Coating compositions in powder form can also be prepared for example by ultrasonic wave micronization.

An aqueous powder coating slurry also can be used as a coating composition.

In order to initiate the radical polymerization, the coating compositions containing radical initiators can be thermally activated. The initiators in the composition disintegrate at varying temperatures according to the type of initiators. Examples of such radical initiators are as follows: organic peroxides, organic azo compounds or C—C cleaving initiators, such as, dialkyl peroxides, peroxocarboxylic acids, peroxo dicarbonates, peroxide esters, hydroperoxides, ketone peroxides, azodinitriles or benzpinacolsilyl ethers. Preferred amounts of radical initiators are between 0.1 to 5 wt-%, based on the resin solids of binder, of the above radical initiators and reactive thinners that are capable of radical polymerization can be included in the coating composition.

The coating compositions that can be chemically cross-linked solely by radical polymerization of double bonds can be unpigmented coatings, e.g., transparent clear coats or transparent sealers, or can be a pigmented coating. Sealers here are understood to mean coating compositions, which are applied to the external coating layer of a coated surface of a substrate, for example, to obtain coatings that are particularly mar resistant.

The coating compositions can contain fillers and/or transparent and color- and/or special effect-imparting pigments. All organic or inorganic pigments that are conventionally used in coating compositions are suitable as color-imparting pigments. Examples of inorganic or organic color-imparting pigments are titanium dioxide, micronized titanium dioxide, iron oxide pigments, carbon black, azo pigments, phthalocyanine pigments, quinacridone or pyrrolopyrrole pigments. Examples of special effect-imparting pigments are metallic pigments, for example, of aluminum, copper or other metals; interferential pigments, such as, metal oxide-coated metallic pigments, for example, titanium dioxide-coated or mixed oxide-coated aluminum, coated mica, such as, for example, titanium dioxide-coated mica and graphite special effect pigments. Likewise, soluble colors can be used. Examples of fillers suitable for use are silicon dioxide, aluminum silicate, aluminum oxide, barium sulfate, calcium carbonate and talcum.

The coating compositions can contain additives conventionally used in coating. Examples of additives conventionally used in coating are leveling agents, rheologyinfluencing agents, such as, highly dispersed silicic acid or polymeric urea compounds, thickeners, based on partially cross-linked carboxyl-functional polymers or on polyurethanes, defoamers, wetting agents, anti-cratering agents, catalysts, degassing agents, flow additives, antioxidants and light protecting agents based on of HALS-products and/or UV-absorbers. The additives are used in conventional amounts known to a person skilled in the art.

The liquid coating composition generally is adjusted to spray-viscosity with water and/or organic solvents before application.

The process according to the invention is particularly useful for applying for multi-layer coatings. Preferably, the invention relates to a process for multi-layer coating substrates by applying a top coat layer to a substrate that has been coated with one or more coating layers, for example, with a primer and/or filler layer. The top coat layer is applied over the primer and/or filler layer and is a color-and/or special effect-imparting base coat coating composition and a clear coat coating composition or the top coat is a pigmented one-layer top coat coating composition. The top coat layer optionally is coated over with a transparent sealer. At least one of the coating layers is prepared from coating compositions that can be chemically cross-linked solely by radical polymerization of olefinic double bonds, the resin solid of which has a C=C equivalent weight from 300 to 10,000, preferably from 300 to 5,000. The curing of these coating layer(s) is carried out by means of irradiation with NIR radiation in the wave length range from 760–1500 nm.

The coating compositions that can be chemically cross-linked solely by radical polymerization of olefinic double bonds are suitable for use in the process of this invention and are coating compositions that can be used for the preparation of one or more of the following coating layers: a one-layer or preferably, a multi-layer assembly, a primer, a filler, a base coat, a clear coat, a one-layer top coat and a sealer.

According to a preferred embodiment of the process of this invention, a clear coat layer of the coating composition that can be chemically cross-linked solely by radical polymerization of olefinic double bonds is applied to a pigmented base coat layer and is irradiated to form a clear coat layer.

In another preferred embodiment of the process of this invention, a one-layer top coat coating compositions is applied to a substrate that has been coated with one or more layers of coating, for example, with a primer, and/or a filler layer, to form a pigmented top coat layer this is chemically cross-linked solely by radical polymerization of olefinic double bonds.

The application of the coating compositions by the process of this invention is carried out by conventional methods, preferably by spray application.

Any substrates, such as metallic and synthetic substrates are suitable substrates, for example, iron, zinc, aluminum, magnesium, stainless steel or their alloys, as well as polyurethanes, polycarbonates or polyolefines.

While applying the coating compositions that are to be cured by means of NIR radiation, the respective coating compositions that can be chemically cross-linked solely by radical polymerization of olefinic double bonds are applied to the corresponding substrate. After application, typically solvents are allowed to flash-off, for example, within 3 to 40 minutes, at 20 to 80° C. An advantage of the process this invention is that the flash-off phase prior to the NIR irradiation is not absolutely required. After the optional flash-off phase, irradiation with NIR radiation is done. The irradiation can thereby be carried out in a continuous or in a discontinuous manner (timed).

The irradiation can take place in a conveyor installation, equipped with one or more NIR radiators, or by means of one or more NIR radiators, which are positioned in front of the object to be irradiated or the spot to be irradiated or the substrate to be coated and/or one or more NIR radiators are moved with respect to each other during the irradiation. The substrate to be coated can be moved by means of an irradiation tunnel equipped with one or more NIR radiators and/or a robot equipped with one or more NIR radiators can guide the one or more NIR radiators over the surface of the substrate.

Duration of the irradiation, distance to the object and/or radiation capacity of the NIR radiator can be varied in the course of the radiation. The distance between the object and NIR radiator can be 2 to 60 cm; the duration of radiation can be 1 to 300 seconds. The duration of radiation thereby either refers to the duration of a continues irradiation or to the sum of the durations of various irradiation phases. By selectively choosing the different parameters, various surface temperatures may be set from 80 to 250° C. Under some coating conditions the surface temperatures can exceed 250° C.

The irradiation with NIR radiation can be carried out in one or more successive irradiation steps. This means that the energy to be provided by the irradiation can be supplied completely in one irradiation step or stepwise in two or more irradiation steps. If coating layers with a high layer thickness are to be irradiated, the coating composition can be applied in two or more spraying operations and after each, the applied layer of coating is irradiated with NIR radiation.

The drying or the curing of the coating layers applied in the preferred process for multi-layer coating according to the invention can be carried out in various ways. For example, if two coating layers, each from coating compositions that can be chemically cross-linked solely by radical polymerization of olefinic double bonds, which are to be cured by means of NIR radiation, are applied successively, then the first coating layer, for example, a base coat layer, can be first applied and irradiated with NIR radiation. In the next step the second coating layer, for example, a clear coat layer, can be applied and in its turn be irradiated by means of NIR radiation. Alternatively, it is also possible to apply both coating layers wet-in-wet, optionally, by interrupting with a flash-off phase, and cure both coating layers, for example, a complete base coat/clear coat assembly, can be cured together with one or more NIR-irradiation steps.

An analogous procedure is likewise possible. For example, a one-layer top coat layer (pigmented or non pigmented) is applied from a coating composition that can be chemically cross-linked solely by radical polymerization of olefinic double bonds to a second coating, e.g., a filler coating or base coating, from a coating composition that can be chemically cross-linked solely by radical polymerization of olefinic double bonds; both layers are cured with one or more NIR irradiation steps.

If a clear coating composition that can be chemically cross-linked solely by radical polymerization of olefinic double bonds, and is to be cured by means of NIR radiation, is applied to a base layer coating layer from a coating composition that can be chemically cross-linked in a different way and/or a physically drying coating composition, which is not to be cured by means of NIR radiation, then the base coat coating composition is first applied and cured at temperatures of 20–160° C. Then, the clear coat coating composition is applied and cured by NIR radiation.

Likewise, it is possible to apply the clear coat coating composition wet-in-wet, optionally after a flash-off phase, to the base coat layer and then to carry out the NIR irradiation.

It is also possible to apply any chemically cross-linkable and/or physically drying coating composition, which does not contain binders that are capable of radical polymerization, for example, as a base coat coating composition, then to irradiate by means of NIR radiation and then to apply and cure a clear coat coating composition according to the process according to the invention. Sufficient heat is generated by the NIR radiation to cure both of the coating compositions.

The process according to the invention can be carried out by using UV-radiation in addition to the NIR radiation. In this case, the coating compositions contain photoinitiators for the UV curing to occur.

If coating compositions are used in the process according to the invention, which do not correspond to the coating compositions according to the invention that can be chemically cross-linked solely by radical polymerization of olefinic double bonds, which are to be cured with NIR radiation, these coating compositions can be solvent-based or aqueous coating compositions, or coating compositions in powder form.

The process of this invention can be used in industrial and automotive coating, in the latter case in the same manner in a vehicle coating production line or as in vehicle repair coating.

The process of this invention makes it possible to obtain a rapid curing and hardening of the applied coating layer within a few seconds to minutes of coating compositions that are chemically cross-linked solely by radical polymerization of olefinic double bonds. In comparison to conventional coating compositions based on radically curable binders and photoinitiators that are cured with UV radiation, the coatings formed by the process of this invention exhibit either no yellowing or substantially less yellowing. Furthermore, completely cured and hardened coatings are obtained with the process of this invention when radical scavengers, e.g., light protecting agents based on HALS-products, are used in the coating composition. Pigmented and non-pigmented coatings having an excellent hardness and surface quality are obtained with the process of this invention. An additional advantage of the process of this invention is that to obtain the above-mentioned properties; the use of thermal radical initiators in the coating compositions are not required. Because the coatings that can be obtained with the process of this invention do not exhibit any yellowing or only slight yellowing, and because light protecting agents based on HALS-products can be employed without having the known disadvantages, the process of this invention can in particular be advantageous for preparing clear coat or pigmented top coat layers.

The invention shall be explained in more detail on the basis of the examples below. All parts and percentages are on a weight basis unless otherwise indicated.

EXAMPLE 1

A urethane acrylate was prepared as follows:

A 75 wt-% solution of a urethane acrylate (of HDI-biuret, neopentyl glycol and butanediol monoacrylate in a molar ratio of 1:0.125:2.75) in butyl acetate was prepared. Neopentyl glycol was dissolved in butyl acetate at 65° C. Then the HDI-biuret was added at 65° C. and the batch was heated to 70° C. After completion of the exothermic reaction, the reaction was continued at 80° C. until a constant NCO-value was reached. Then 4-methoxyphenol (inhibitor) and DBTL (dibutyl tin dilaurate—catalyst) were added, each in an amount of 0.05 wt-%, based on the total batch. Butanediol monoacrylate was metered in at 60° C. without exceeding 80° C. After reaching an NCO-value of <0.1, the resin solid content was subsequently adjusted with butyl acetate.

Preparation of clear coats KL 1–5 with binders that are capable of radical polymerization:

5 different clear coats (KL 1–5) of the compositions shown in Table 1 were prepared. The clear coats each contain light protecting agents based on HALS-products.

KL 1–3 were prepared with various radical initiators (KL 1: with azo-initiator, KL 2: with peroxide-initiator, KL 3: with C—C cleaver). KL 4 was prepared with without radical initiators. KL 5 was prepared with a photoinitiator.

TABLE 1

| Component | KL 1 | KL 2 | KL 3 | KL 4 | KL 5 |
|---|---|---|---|---|---|
| Urethane acrylate according to Ex. 1 | 95.82 | 95.82 | 97.03 | 97.94 | 95.82 |
| Tinuvin 400 (1) | 0.90 | 0.90 | 0.90 | 0.92 | 0.90 |
| Tinuvin 292 (2) | 0.90 | 0.90 | 0.90 | 0.92 | 0.90 |
| Ebecryl 350 (3) | 0.22 | 0.22 | 0.22 | 0.22 | 0.22 |
| Vazo 88 (4) | 2.16 | | | | |
| Trigonox 21 (5) | | 2.16 | | | |
| Initiator BK (6) | | | 0.95 | | |
| Darocur 1173 (7) | | | | | 2.16 |
| Total | 100 | 100 | 100 | 100 | 100 |

(1) commercially available UV-absorber (2-hydroxyphenyl triazine) (CIBA)
(2) Commercially available HALS-product (hindered amine) (CIBA)
(3) Commercially available leveling additive (acrylized silicone derivative) (UCB)
(4) Commercially available radical initiator (azo compound) (DuPont)
(5) commercially available radical initiator (peroxide) (Akzo Nobel)
(6) Commercially available radical initiator (C-C cleaver) (Bayer)
(7) Commercially available photoinitiator (2-hydroxy-2-methyl-1-phenyl-propan-1-one) (CIBA)

Each of the above prepared clear coats KL 1 to 5 were adjusted to spray-viscosity with butyl acetate.

Application and Curing of the Clear Coats KL 1 to 5

Clear coats KL3–5 were each applied to separate test sheets coated with silver-metallic colored base coats by using spray application resulting in a dry coating layer having a thickness of 35 µm. Each of the clear coats KL 1–5 were applied to separate test sheets coated with black base coats by using spray application resulting in a dry layer having a thickness of 35 µm (flash-off of the clear coat each time for 10 minutes at 80° C.).

Determination of the Yellowing Tendency

The applied clear coats KL 3 and KL 4 were irradiated with a commercially available NIR radiator (High-burn radiator from the Adphos Company, 400 kW/m$^2$, capacity 100%) for 6 seconds at a distance radiator/object of 2.5 cm.

For comparison, the applied clear coat KL 5 was irradiated with a commercially available UV radiator (Hg-medium pressure radiator from the Fusion Company, 240 W/cm, capacity 100%) for 3 seconds at a distance radiator/object of 11 cm.

In order to determine the yellowing tendency, the b* values (CIELAB-system) of the pure base coats (BC) and of those base coats coated over with clear coats KL 3, KL 4 and KL 5 (BC+CC) were measured with a spectrophotometer (according to DIN 6174) and the difference Δb* was calculated.

The measurement results are represented in Table 2.

TABLE 2

| Clear coat | Curing | b* BC | b* BC + CC | Δb* |
|---|---|---|---|---|
| KL 3 | NIR | −1.74 | −0.60 | 1.14 |
| KL 4 | NIR | −1.74 | −0.73 | 1.01 |
| KL 5 | UV | −1.74 | 0.01 | 1.75 |

The clear coats KL 3 and KL 4 (according to the invention) exhibit significantly less yellowing after hardening by means of irradiation with NIR radiation than the clear coat KL 5 (comparison) after hardening by means of UV radiation.

Determination of the Hardening

The applied clear coats KL 1 to KL 4 were irradiated by means of the commercially available NIR radiator (described above) for 8 seconds at a distance radiator/object of 10 cm.

For comparison, the applied clear coats KL 1 to 4 to KL 4 were cured for 30 minutes at 140° C. in the oven and the clear coat KL 5 was irradiated by means of the commercially available UV radiator (described above) for 3 seconds at a distance radiator/object of 11 cm.

In order to determine hardening, the pendulum hardness according to König (PH) was determined according to DIN 53 157. After a xylene test (XyT) the pendulum hardness was again determined after 15 minutes and after 2 hours. The xylene test was carried out by each time positioning a filter paper impregnated with xylene onto the cured clear coat layer for 10 minutes and covering it with a Petri dish. The xylene was then wiped off with a paper towel.

The results of the above tests are shown in Table 3.

TABLE 3

| Clear coat | Curing | PH | XyT After 15 minutes | XyT after 2 h |
|---|---|---|---|---|
| KL 1–4 | Oven 30 minutes/140° C. | | Adheres | |
| KL 1 | NIR | 69 | m 70 | 69 |
| KL 2 | NIR | 75 | m 73 | 76 |
| KL 3 | NIR | 66 | m 66 | 67 |
| KL 4 | NIR | 69 | m 68 | 70 |
| KL 5 | UV | 64 | m 65 | 64 | m: marking was determined

Upon curing the clear coats KL 1 to KL 4 in the oven (comparison), no hardening was obtained. The surface of the clear coats remained tacky.

Upon curing the clear coats KL 1 to KL 4 by means of NIR radiation (according to the invention), hardening was obtained. Even after the xylene test, no impairment of the hardness could be observed. The results of the hardening by means of NIR radiation thereby correspond to those that are obtained when curing by means of UV radiation (KL 5, comparison).

EXAMPLE 2

Preparation of Black Pigmented Top Coats having Binders Capable of Radical Polymerization 3 different top coats (DL 1–DL 3) of the composition indicated in Table 4 were prepared. The top coats each contain light protecting agents based on HALS-products.

DL 1 and DL 2 contained various radical initiators (DL 1: with azo-initiator, DL 2: with C—C cleaver) and DL 3: contained a photoinitiator

TABLE 4

| Component | DL 1 | DL 2 | DL 3 |
|---|---|---|---|
| Urethane acrylate according to Ex. 1 | 93.78 | 94.96 | 93.78 |
| Carbon black FW200 (1) | 2.12 | 2.13 | 2.12 |
| Tinuvin 400 (2) | 0.88 | 0.89 | 0.88 |
| Tinuvin 292 (3) | 0.88 | 0.89 | 0.88 |
| Ebecryl 350 (4) | 0.22 | 0.21 | 0.22 |
| Vazo 88 (5) | 2.12 | | |
| Initiator BK (6) | | 0.92 | |
| Darocur 1173 (7) | | | 2.12 |
| | 100 | 100 | 100 |

(1) Commercially available carbon black pigment (Degussa-Hüls)
(2)–(7) Described in Example 1.

The above prepared top coats were adjusted to spray-viscosity with butyl acetate.

Application and Curing of the Top Coats DL 1–DL 3.

The above prepared top coats DL 1–DL 3 were applied to coil-coating test sheets by using spray application resulting dry layer thicknesses of about 30 μm (flash-off for 10 minutes at 80° C.).

Determination Hardening

The applied top coats DL 1 and DL 2 were irradiated by means of a commercially available NIR radiator (described in Example 1) for 8 seconds at a distance radiator/object of 10 cm:

For comparison, the top coats DL 1 and DL 2 were cured for 30 minutes at 140° C. in the oven and the top coat DL 3 was irradiated by means of a commercially available UV radiator (described in Example 1) for 3 seconds at a distance radiator/object of 11 cm.

In order to determine the hardening, the pendulum hardness according to König (PH) according to DIN 53 157 was determined. After a xylene test (XyT), the pendulum hardness was again determined after 15 minutes and after 2 hours. The xylene test was carried out by positioning a filter paper impregnated with xylene for 10 minutes on the cured clear coat layer and then covering it with a petri dish. The xylene was then wiped off with a paper towel.

The results of the test are in Table 5.

TABLE 5

| Top coat | Curing | PH | XyT after 15 minutes | XyT after 2 h |
|---|---|---|---|---|
| DL 1–2 | Oven 3 30 minutes/140° C. | | Tacky | |
| DL 1 | NIR | 136 | 137 | 137 |
| DL 2 | NIR | 98 | 90 | 96 |
| DL 3 | UV | O surface is not adhesive, however film soft, PH cannot be determined | | |

Upon curing the top coats DL 1 and DL 2 in the oven (comparison), no hardening was obtained. The surface of the top coats remained tacky.

Upon curing the top coats DL 1 and DL 2 by means of NIR radiation (according to the invention), hardening was obtained. Even after the xylene test a significant loss of hardness did not occur.

The top coat DL 3 could not be hardened by irradiation with UV (comparison).

What we claim is:

1. A process for coating a substrate which comprises
   a. applying at least one layer of a coating composition to a substrate; wherein the coating composition comprises resin solid comprising components having olefinic double bonds and at least one radical scavenger, said resin solid having a C=C equivalent weight from 100 to 10,000 and is chemically cross-linkable solely by radical polymerization of said olefinic double bonds; and b. curing the layer of coating composition by irradiation of the layer with NIR radiation in the wave length range from 760–1500 nm thereby chemically crosslinking the olefinic double bonds solely by radical polymerization.

2. The process of claim 1, whereby the process forms a multi-layer coating on a substrate by applying a top coat layer to a substrate that has been coated with at least one coating layer, whereby the top coat layer comprises a pigmented base coat coating composition and a clear coat coating composition applied over the base coating composition, and whereby at least one of the coating layers is prepared from a coating composition comprising resin solid having olefinic double bonds and having a C=C equivalent weight from 100 to 10,000 and is chemically crosslinkable solely by radical polymerization of said olefinic double bonds; at least one radical scavenger comprising a hindered amine light stabilizer; and curing of the coating layer being carried out by means of NIR radiation in the wave length range from 760–1500 nm.

3. The process of claim 1, wherein at least one of the coating layers is prepared from a coating composition comprising resin solid comprising components having olefinic double bonds, said resin solid having a C=C equivalent weight from 100 to 5,000 and being chemically cross-linked solely by radical polymerization of said double bonds.

4. The process of claim 1, wherein the curing of the coating layer is carried out by means of irradiation with NIR radiation in the wave length range from 760–1200 nm.

5. The process of claim 1, wherein the irradiation of the coating layer is carried out by means of NIR radiators having an intensity (radiation capacity per surface) from 10 kW/m$^2$ to 15 MW/m$^2$.

6. The process of claim 1 wherein the process is a process for coating industrial components.

7. The process of claim 1, wherein the coating composition that can be chemically cross-linked solely by radical polymerization of olefinic double bonds is a clear coat coating composition.

8. The process of claim 1, wherein the coating composition that can be chemically cross-linked solely by radical polymerization of olefinic double bonds is pigmented one-layer top coat coating composition.

9. The process of claim 1, wherein the process is a process for coating vehicles.

10. The process of claim 1, wherein the process is a process for coating vehicle parts.

* * * * *